US012632451B2

(12) United States Patent
Noll et al.

(10) Patent No.: US 12,632,451 B2
(45) Date of Patent: May 19, 2026

(54) CHECKER FOR DISTRIBUTED PLANS

(71) Applicant: SAP SE, Walldorf (DE)

(72) Inventors: Stefan Noll, Sandhausen (DE); **Paul
Willems, Heidelberg (DE); Faming Qu**,
Xi'an (CN)

(73) Assignee: SAP SE, Walldorf (DE)

( * ) Notice: Subject to any disclaimer, the term of this
patent is extended or adjusted under 35
U.S.C. 154(b) by 0 days.

(21) Appl. No.: 18/733,735

(22) Filed: Jun. 4, 2024

(65) Prior Publication Data

US 2025/0371008 A1      Dec. 4, 2025

(51) Int. Cl.
G06F 16/90 (2019.01)
G06F 16/2453 (2019.01)

(52) U.S. Cl.
CPC .. G06F 16/24542 (2019.01); G06F 16/24537
(2019.01)

(58) Field of Classification Search
None
See application file for complete search history.

(56) References Cited

U.S. PATENT DOCUMENTS

| | | | | |
|---|---|---|---|---|
| 5,634,053 A * | 5/1997 | Noble | .................... | G06F 16/258 |
| | | | | 707/999.009 |
| 2008/0189239 A1* | 8/2008 | Bawa | ....................... | G06F 16/22 |
| 2011/0107151 A1* | 5/2011 | Che | ........................... | G06F 16/24 |
| 2015/0142724 A1* | 5/2015 | Nair | ....................... | G06F 16/283 |
| | | | | 707/602 |
| 2017/0004173 A1* | 1/2017 | Simitsis | ............ | G06F 16/24542 |
| 2017/0339203 A1* | 11/2017 | Kekre | ................ | G06F 16/24568 |
| 2018/0060396 A1* | 3/2018 | Johnson | .............. | G06F 16/9024 |
| 2019/0026336 A1* | 1/2019 | Tian | ..................... | G06F 16/2455 |
| 2022/0318263 A1* | 10/2022 | Singh | ................ | G06F 16/24568 |
| 2023/0162415 A1* | 5/2023 | Rosen | ................... | G06F 16/248 |
| | | | | 345/440 |

OTHER PUBLICATIONS

Gupta, S. "Deadlock detection techniques in distributed database
system." International Journal of Computer Applications 74.21
(2013): 41-45.
Shkapenyuk, V. et al., "Deadlock resolution in pipelined query
graphs." (2005) 16 pages (Available at http://nms.csail.mit.edu/
~stavros/pubs/deadlock.pdf).
Extended European Search Report issued in European Application
No. 25180308.6-1207 mailed Nov. 7, 2025, 9 pages.

* cited by examiner

*Primary Examiner* — Son T Hoang
(74) *Attorney, Agent, or Firm* — Mintz Levin Cohn Ferris
Glovsky and Popeo, P.C.

(57)      ABSTRACT
A database management system receives a first query execu-
tion plan to be executed on a plurality of computing nodes.
The database management system determines whether the
first query execution plan would result in an execution
deadlock by performing the following three steps. First, the
database management system generates a reduced represen-
tation of a portion of the first query execution plan corre-
sponding to each computing node of the plurality of com-
puting nodes. Second, the database management system
merges the reduced representations of a plurality of portions
of the first query execution plan into a set of global pipelines.
Third, the database management system performs at least
one deadlock check on the set of global pipelines. The
database management system prevents execution of the first
query execution plan responsive to the at least one deadlock
check returning an error.

20 Claims, 18 Drawing Sheets

*1600*

CHECKER FOR DISTRIBUTED PLANS

TECHNICAL FIELD

The present disclosure generally relates to executing database queries in a distributed manner on a plurality of nodes.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. A database query is a mechanism for retrieving data from one or more database tables. Queries may be generated in accordance with a corresponding query language. For example, structured query language (SQL) is a declarative querying language that is used to retrieve data from a relational database. Given the complexity of queries and/or the volume of queries, the underlying databases face challenges when attempting to optimize performance.

SUMMARY

In some implementations, a database management system receives a first query execution plan to be executed on a plurality of computing nodes. In an example, the database management system determines whether the first query execution plan would result in an execution deadlock by performing the following three steps. First, the database management system generates a reduced representation of a portion of the first query execution plan corresponding to each computing node of the plurality of computing nodes. Second, the database management system merges the reduced representations of a plurality of portions of the first query execution plan into a set of global pipelines. Third, the database management system performs at least one deadlock check on the set of global pipelines. The database management system prevents execution of the first query execution plan responsive to the at least one deadlock check returning an error.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Database queries may be executed in a distributed setup on a plurality of computation nodes. A computation node may also be referred to as a computing node, or as a "node" for short. Each node may include an executable plan that consists of one or more executable pipelines. A pipeline is a sequence of operators. On a given node, pipelines may be executed sequentially. Pipelines of different nodes may be executed in parallel. Operators in a pipeline are started in a specific order, one after the other, may be run in parallel, and are finished in a specific order, one after the other. An operator is started when all its previous operators have been started, and an operator is actively being finished if all of the operator's previous operators have been stopped.

Global pipelines could be connected erroneously such that they have a cyclic dependency. To prevent these erroneously connected global pipelines, methods and mechanisms for detecting if a distributed executable plan (consisting of any number of nodes, pipelines, and operators) would result in a deadlock if the plan were executed are needed. This type of deadlock may be referred to as an execution deadlock. As used herein, the term "execution deadlock" is defined as a condition when multiple execution threads or tasks cannot make progress because each thread or task is waiting on another thread or task which is also stuck. In other words, an "execution deadlock" occurs when no single process, thread, or pipeline is capable of executing an action. It is noted that the terms "execution deadlock" and "deadlock" may be used interchangeably herein. Detecting if a distributed executable plan would result in an execution deadlock would preferably be accomplished prior to executing the plan. Accordingly, methods and mechanisms for detecting execution deadlock conditions are presented herein.

Figure 1:
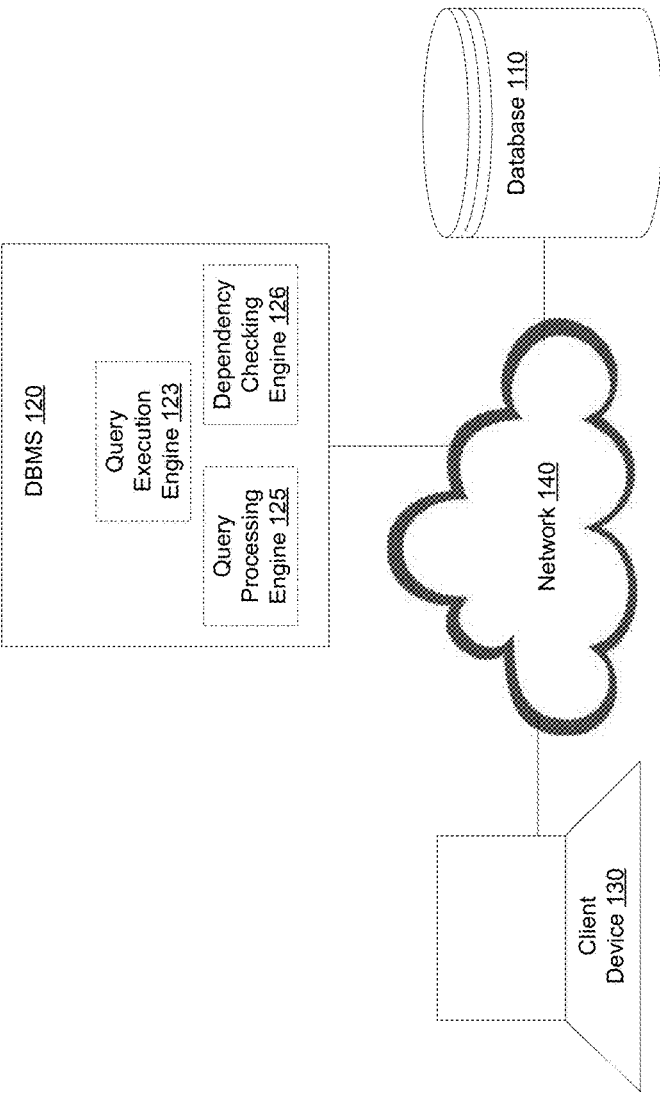
FIG. 1 illustrates a diagram of an example of a computing system, in accordance with some example implementations of the current subject matter.

FIG. 1 depicts an example of a computing system 100, in accordance with some example embodiments. Referring to FIG. 1, the computing system 100 may include a database 110, a database management system (DBMS) 120, and a client device 130. In an example, database management system 120 includes query execution engine 123, query processing engine 125, and dependency checking engine 126. In other examples, database management system 120 may include other types of components. It is noted that while only a single database 110 and a single client device 130 are shown in FIG. 1, this is merely to avoid cluttering the figure. It should be appreciated that database 110 is representative of any number of databases, database management system 120 is representative of any number of database management systems, and client device 130 is representative of any number of client devices that may be included as part of computing system 100.

From an application or client perspective, it can be extremely cumbersome to access databases such as database 110. For example, an application may need to query different types of databases using complex queries. As a consequence, the application layer would need to be configured to handle the various types of databases and the various query types. Additionally or alternatively, each database 110 may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database 110 and may thus reduce the performance and response times for queries on that database layer.

In some example implementations, query execution engine 123 and/or query processing engine 125 may decouple the higher-level, application layer from the database layer (e.g., the persistence or storage layer where data including database tables may be stored and/or queried using instructions, such as commands and/or the like). The query execution engine 123 and/or query processing engine 125 may be implemented separately from the database layer and/or the application layer. Further, the query execution engine 123 and/or query processing engine 125 may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

After query execution engine 123 and/or query processing engine 125 generate a query plan, dependency checking engine 126 may be configured to check for cyclic dependencies in the query plan. In an example, dependency checking engine 126 may check if one or more conditions are detected for the query plan, where each condition corresponds to a potential deadlock that may occur during execution of the query plan. These conditions may be referred to as deadlock conditions. If a deadlock condition is detected by dependency checking engine 126, then execution of the query plan may be prevented. Additionally and/or alternatively, if a deadlock condition is detected, database management system 120 may cause a new query plan to be generated and/or cause a previous iteration of a query plan to be executed. If a new query plan is generated, this new query plan may be analyzed by dependency checking engine 126 to determine if a deadlock condition is detected. If no deadlock conditions are detected for the new query plan, execution of the new query plan may be allowed.

The database 110, the database management system 120, and the client device 130 may be communicatively coupled via a network 140. In some example embodiments, the database 110 may be a relational database. However, it should be appreciated that the database 110 may be any type of database including, for example, an in-memory database, a hierarchical database, an object database, an object-relational database, and/or the like. For example, instead of and/or in addition to being a relational database, the database 110 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 120 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a desktop computer, a laptop, a smartphone, a tablet computer, a wearable appliance, a virtual assistant, an Internet-of-Things (IoT) appliance, and/or the like.

Figure 2:
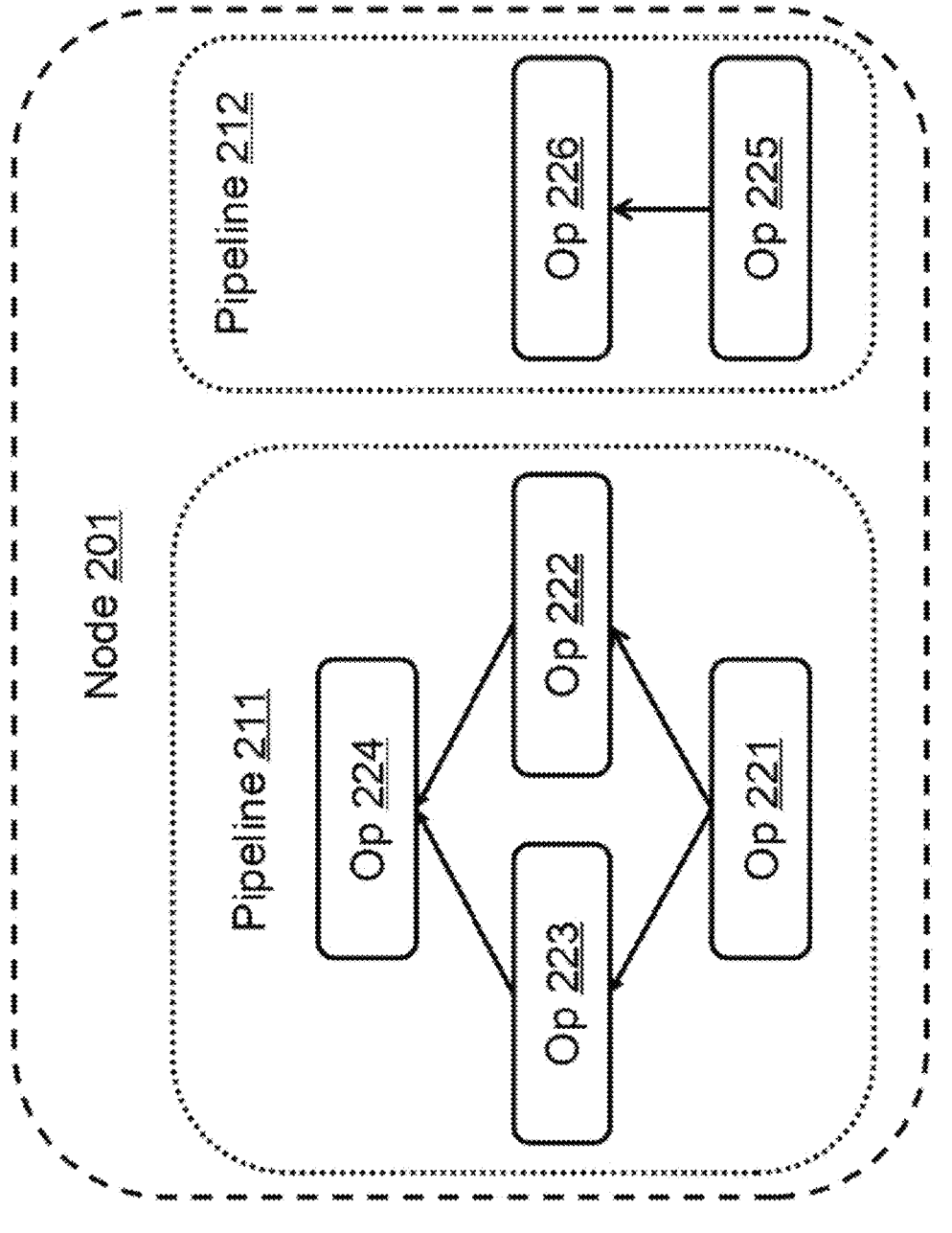
FIG. 2 illustrates a diagram of a node for executing at least a portion of a pipeline, in accordance with some example implementations of the current subject matter.

Turning now to FIG. 2, a diagram of a node 201 for executing at least a portion of a pipeline is depicted, in accordance with one or more embodiments of the current subject matter. On node 201, there is an executable plan that consists of one or more executable pipelines (e.g., pipeline 211, pipeline 212). A pipeline is a sequence of operators. As used herein, the term "operator" may be defined as an object of a class, where the object has a run method. The body of the run method is a sequence of execution steps.

On a given node, pipelines may be executed sequentially (i.e., one after the other). Pipelines of different nodes may be executed in parallel. Operators in a pipeline are started in a specific order, one after the other, may run in parallel, and are finished in a specific order, one after the other. An operator is started when all of its previous operators have been started. An operator is actively being finished if all of the operator's previous operators have been stopped.

In a non-distributed example, the operators in pipeline 211 would be started in order: 221, 223, 222, 224. Next, operators 221, 222, 223, and 224 may run in parallel. Then, the operators would finish in order: 221, 222, 223, 224. Next, the operators in pipeline 212 would be started: 225, 226. Then, operators 225 and 226 may run in parallel. Then, the operators would finish in order: 225, 226. It should be understood that the example illustrated in FIG. 2 is merely indicative of one type of distributed execution scenario. Other scenarios may include other numbers of pipelines with other arrangements of operators.

Figure 3:
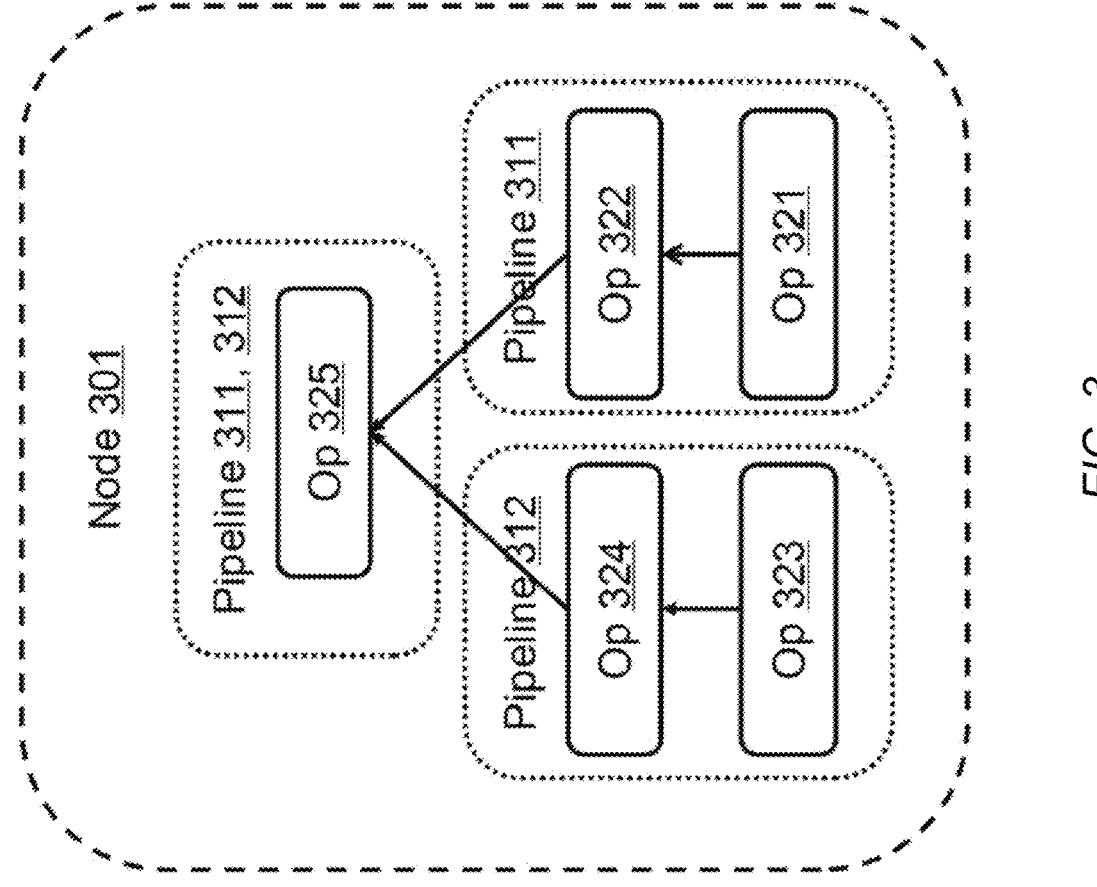
FIG. 3 illustrates a diagram of a node for executing pipelines, in accordance with some example implementations of the current subject matter.

Referring now to FIG. 3, a diagram of a node 301 for executing pipelines is depicted, in accordance with one or more embodiments of the current subject matter. On a single node 301, pipelines 311 and 312 may be connected, and an operator 325 may be in multiple pipelines 311 and 312. In the example shown in FIG. 3, operators 321, 322, and 325 are in pipeline 311, and operators 323, 324, and 325 are in pipeline 312. As shown, operator 325 is in both pipelines 311 and 312. In this example, operators 321, 322, and 325 would be started in order, and operators 321, 322, and 325 would run in parallel. Operators 321 and 322 would then be finished in order. Then, operators 323 and 324 would be started in order. The operators 323, 324, and 325 (still) would be run in parallel. Then, operators 323, 324, and 325 would be finished in order.

Figure 4:
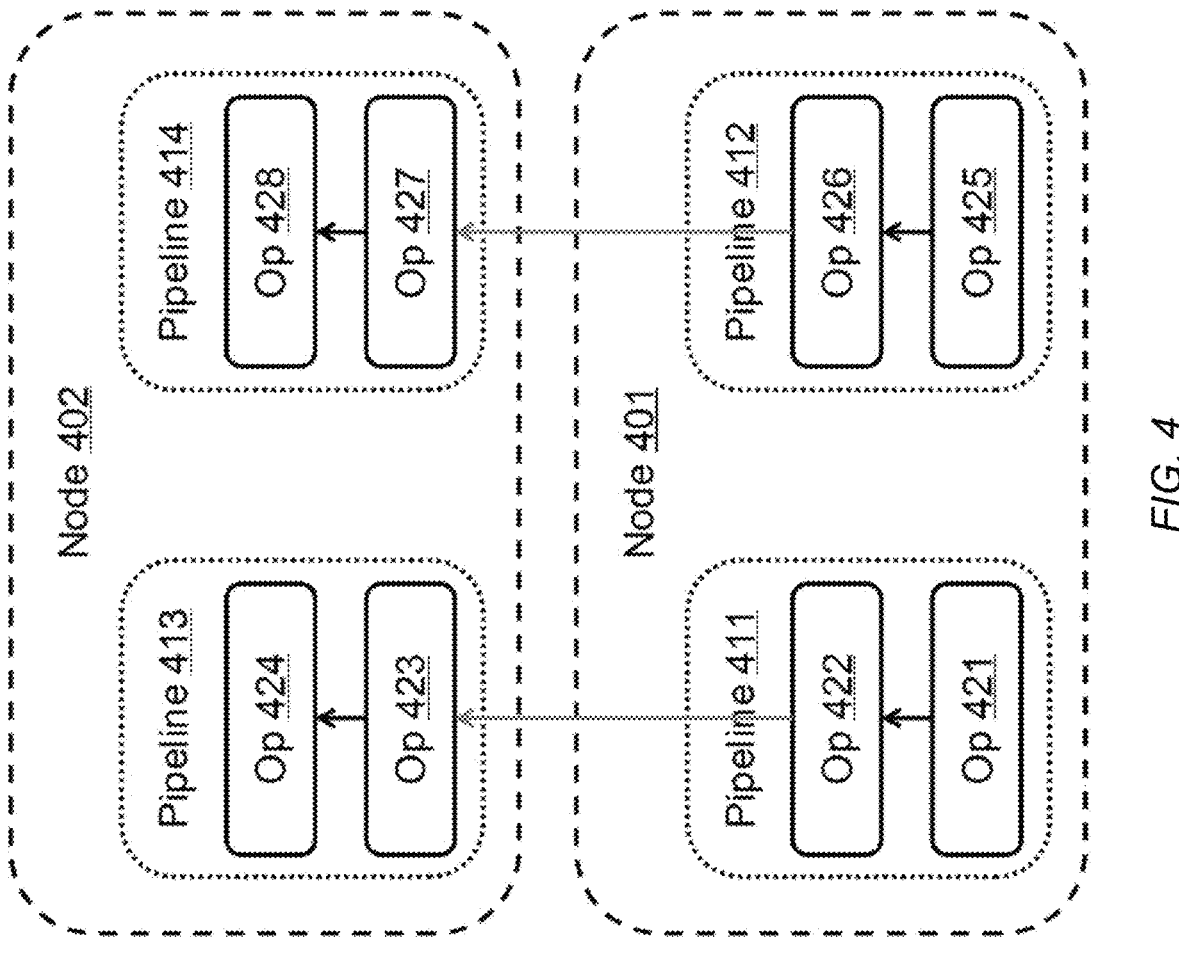
FIG. 4 illustrates a diagram of a pair of nodes and for executing pipelines, in accordance with some example implementations of the current subject matter.

Turning now to FIG. 4, a diagram of a pair of nodes 401 and 402 for executing pipelines is depicted, in accordance with one or more embodiments of the current subject matter. In some embodiments, SQL queries are executed in a distributed setup consisting of two or more computation nodes (e.g., node 401, node 402). When multiple computation nodes 401 and 402 are utilized, as shown in FIG. 4, this may constitute a global pipeline. The global pipeline consists of multiple local pipelines of different nodes, with the multiple local pipelines connected together. Operators that have an outgoing connection to another operator on another node are sending operators, such as operator 422. Sending operators send data over the network. Operators that have an incoming connection from another operator of another node are receiving operators, such as operator 423.

In the example of FIG. 4, operators 421 and 422 would be started one after the other on node 401 at a first point in time and then operators 421 and 422 would run in parallel. At a second point in time (the same as, earlier than, or later than the first point in time), operators 423 and 424 would be started one after the other on node 402 and operators 423 and

424 would run in parallel. Operator 423 can only finish (successfully) once it has received all data from operator 422. Operator 422 can only finish if it sends all data to operator 423. Thus, the operators would finish in the following order: 421, 422, 423, and 424.

Additionally, as shown on the right-side of FIG. 4, operator 426 is a sending operator and operator 427 is a receiving operator. Operator 427 can only finish (successfully) once it has received all data from operator 426. Operator 426 can only finish if it sends all data to operator 427. Similar to pipelines 411 and 413, operators 425 and 426 of pipeline 412 and operators 427 and 428 of pipeline 414 would finish in their proper order of 425, 426, 427, and 428.

Figure 5:
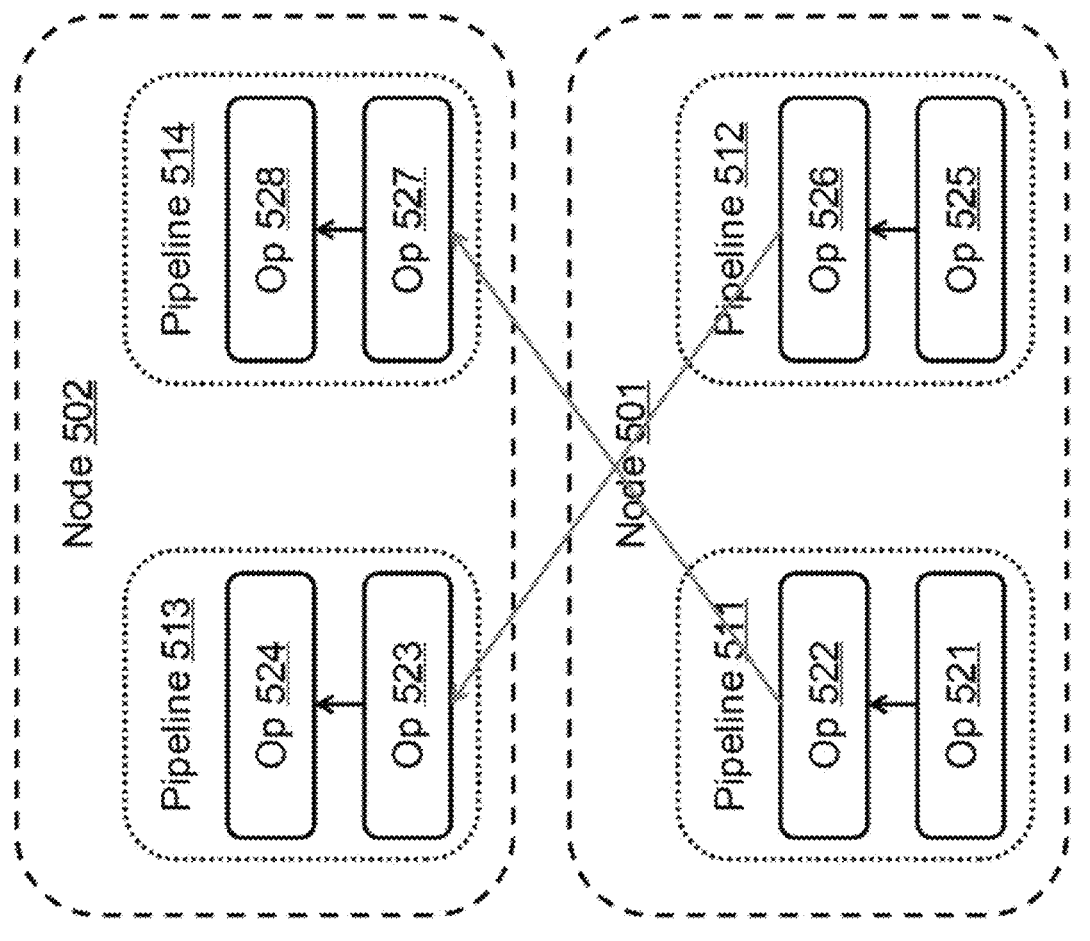
FIG. 5 illustrates a diagram of a pair of nodes and pipelines that when executed would cause a deadlock, in accordance with some example implementations of the current subject matter.

Referring now to FIG. 5, a diagram of a pair of nodes 501 and 502 with pipelines that when executed would cause a deadlock is depicted, in accordance with one or more embodiments of the current subject matter. Global pipelines could be connected erroneously such that they would have a cyclic dependency. As shown in FIG. 5, node 501 includes pipelines 511 and 512 with operators 521 and 522 and operators 525 and 526, respectively, while node 502 includes pipelines 513 and 514 with operators 523 and 524 and operators 527 and 528, respectively. In the example illustrated in FIG. 5, operator 522 would be trying to send data to operator 527, and operator 523 would be waiting for data from operator 526.

Operator 527 would not be started yet, and cannot receive any data, because operators 523 and 524 have not finished yet. Operator 523 cannot finish because operator 526 is not sending data. Operator 526 is not sending data because operator 522 is not finished yet. In some embodiments, methods and mechanisms may be implemented for detecting if a distributed executable plan (consisting of any number of nodes, pipelines, and operators) would result in a deadlock if the executable plan were executed. This deadlock detection may be performed without actually executing the plan.

Figure 6:
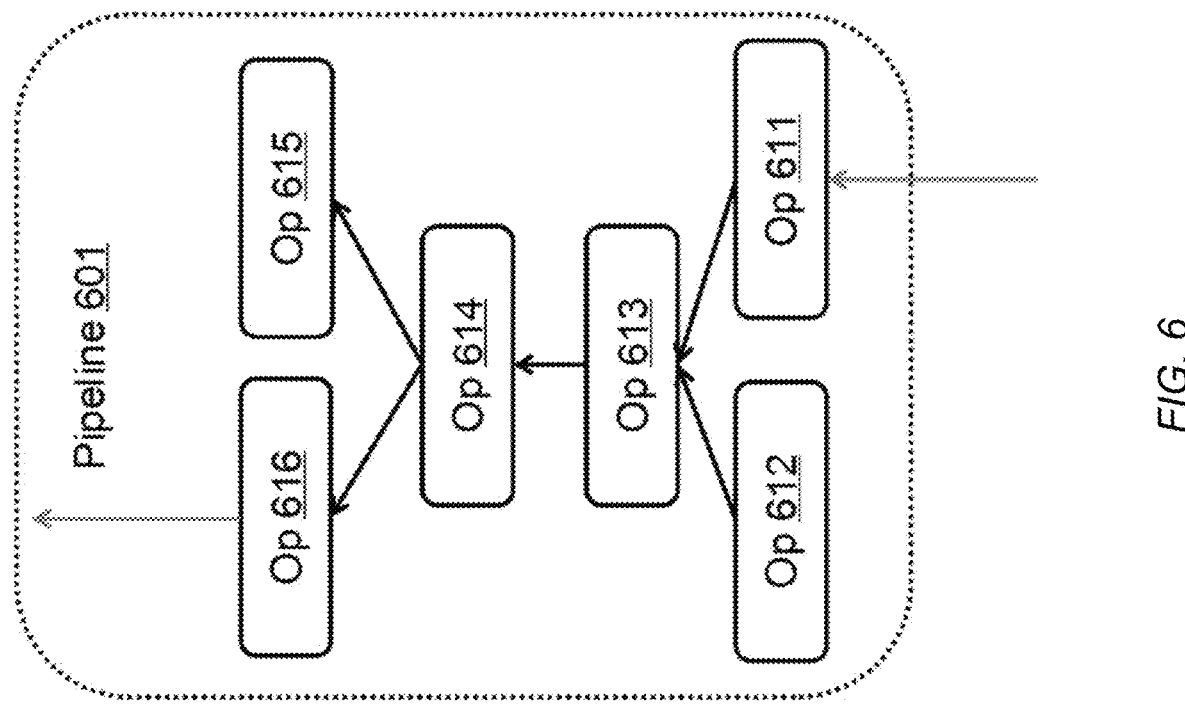
FIG. 6 illustrates a diagram of a pipeline, in accordance with some example implementations of the current subject matter.
Figure 7:
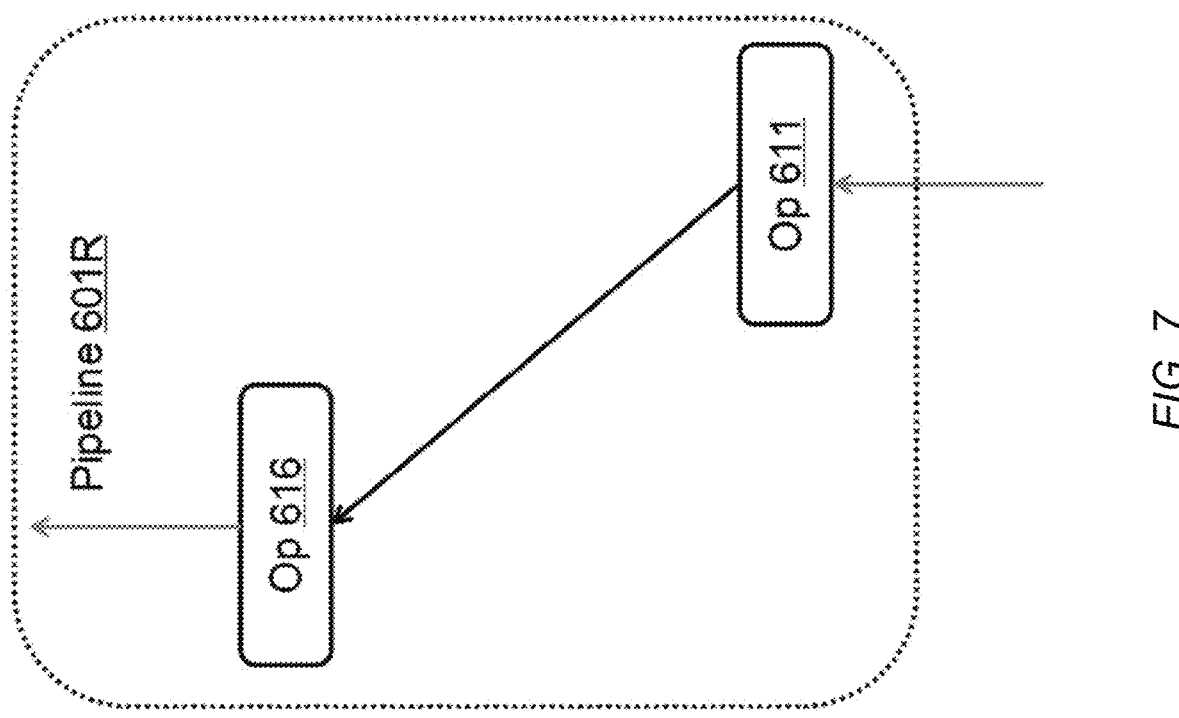
FIG. 7 illustrates a diagram of a reduced representation of a pipeline, in accordance with some example implementations of the current subject matter.

Turning now to FIG. 6, a diagram of a pipeline 601 is shown, in accordance with one or more embodiments of the current subject matter. In an example, a solution to the deadlock detection problem involves computing a reduced representation of each pipeline of a plurality of pipelines on each computation node. A reduced representation of a pipeline consists only of sending operators, receiving operators, and optionally place holders. Place holders may be used to reduce the number of connections in the graph. In the example of pipeline 601, before computing the reduced representation, operators 611, 612, 613, 614, 615, and 616 are included within pipeline 601. As shown in FIG. 7, pipeline 601R is a reduced representation of pipeline 601, with pipeline 601R only having a receiving operator 611 and a sending operator 616.

Figure 8:
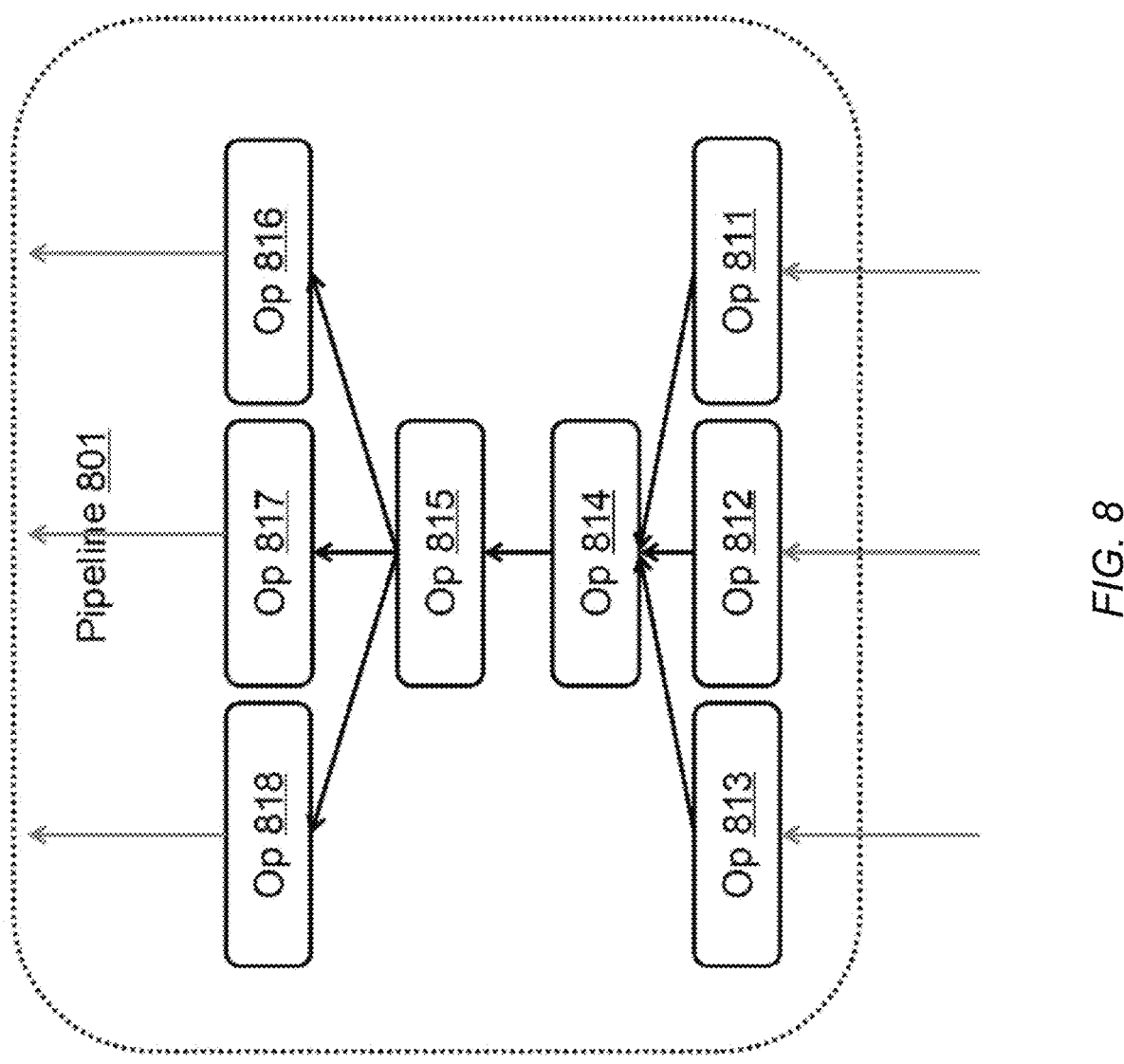
FIG. 8 illustrates a diagram of another pipeline, in accordance with some example implementations of the current subject matter.
Figure 9:
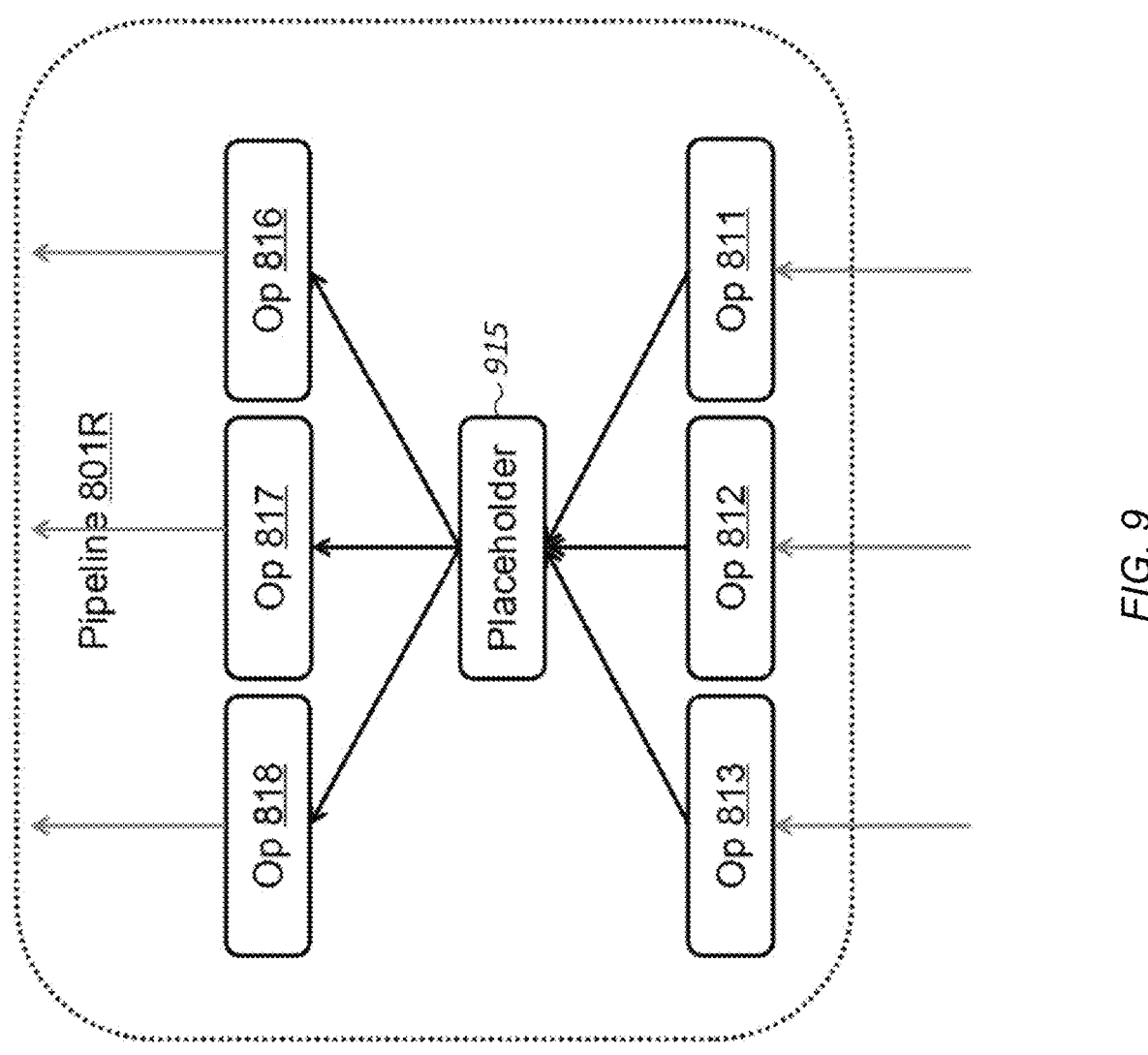
FIG. 9 illustrates a diagram of a reduced representation of a pipeline, in accordance with some example implementations of the current subject matter.

Turning now to FIG. 8, a diagram of another pipeline 801 is shown, in accordance with one or more embodiments of the current subject matter. As shown, pipeline 801 includes three receiving operators 811, 812, and 813 and three sending operators 816, 817, and 818. Pipeline 810 also include operators 814 and 815 which are coupled in between the receiving operators and the sending operators. As shown in FIG. 9, pipeline 801R is a reduced representation of pipeline 801, with placeholder 915 replacing the operators 814 and 815 which are neither receiving nor sending operators.

Figure 10:
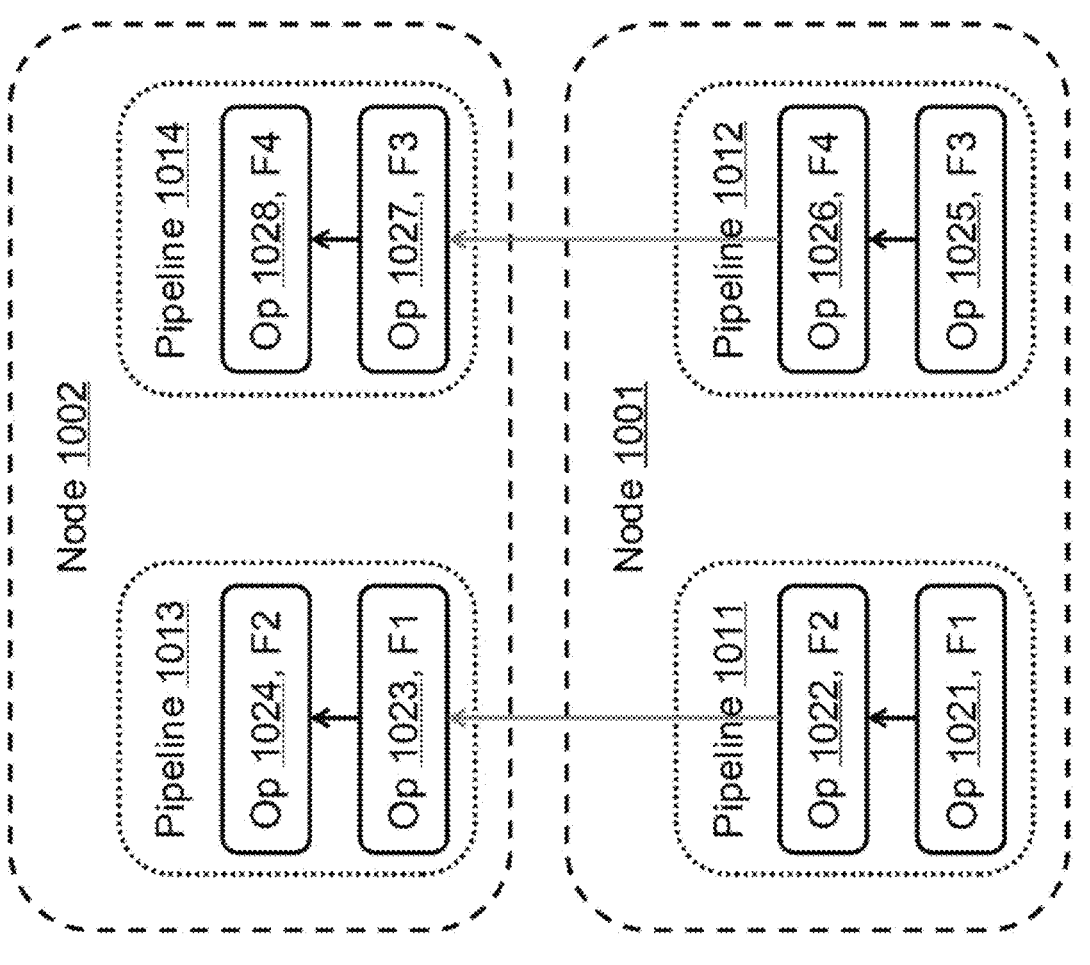
FIG. 10 illustrates a diagram of a pair of computation nodes, in accordance with some example implementations of the current subject matter.

Turning now to FIG. 10, a diagram of a pair of computation nodes 1001 and 1002 are shown, in accordance with one or more embodiments of the current subject matter. Computation node 1001 includes pipelines 1011 and 1012, with pipeline 1011 including operators 1021 and 1022, and pipeline 1012 including operators 1025 and 1026. Computation node 1001 includes pipelines 1013 and 1014, with pipeline 1013 including operators 1023 and 1024, and pipeline 1014 including operators 1027 and 1028. The finishing order for each operator within its computation node is also displayed in FIG. 10, with F1 representing first place in the finishing order, F2 representing second place in the finishing order, F3 representing third place in the finishing order, F4 representing fourth place in the finishing order, and so on.

Figure 11:
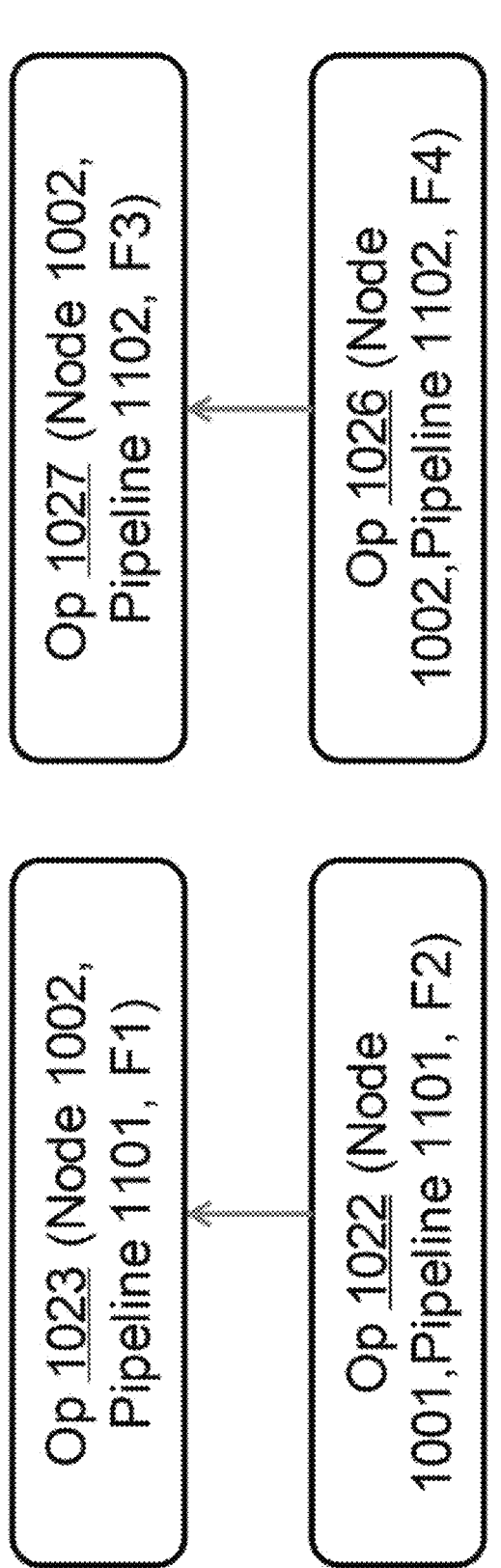
FIG. 11 illustrates a diagram of a reduced representation of the pipelines of a pair of computation nodes, in accordance with some example implementations of the current subject matter.

In an example, each computation node 1001 and 1002 sends the reduced representations of local pipelines to a single main computation node. For an operator, the operator's origin node and the operator's finishing order are stored. On the main computation node, the local pipelines are merged into a set of global pipelines. The reduced representation of the pipelines of computation nodes 1001 and 1002 is illustrated in FIG. 11, where operators 1022 and 1023 are merged into a global pipeline 1101, and operators 1026 and 1027 are merged into a global pipeline 1102. Then, checks may be performed on the representation of the global pipelines.

In another example, a representation of a global pipeline may include two receiving operators R1, R2 on a node N1, where R1 is in an earlier pipeline than R2, where R1 connects to a sending operator S1 on node N2, and where R2 connects to a sending operator S2 on node N2. It is assumed for the purposes of this example that node N1 is different from node N2. In this example, a check may be performed to determine that the sending operator S2 is not in an earlier pipeline than the sending operator S1. The global pipeline shown in FIG. 12 and the following description of FIG. 12 gives an example of when performing this particular check would indicate a deadlock.

The term "earlier pipeline" is defined as a pipeline that executes before another pipeline. In an embodiment, a first pipeline may be determined to be an earlier pipeline than a second pipeline based on the first pipeline having a first pipeline index that is less than a second pipeline index of the second pipeline. In this embodiment, an index assigned to each pipeline determines the execution order of the pipelines, such that pipelines with lower indices are executed prior to pipelines with higher indices. In other words, execution of pipeline 1 is initiated before execution of pipeline 2.

Figure 12:
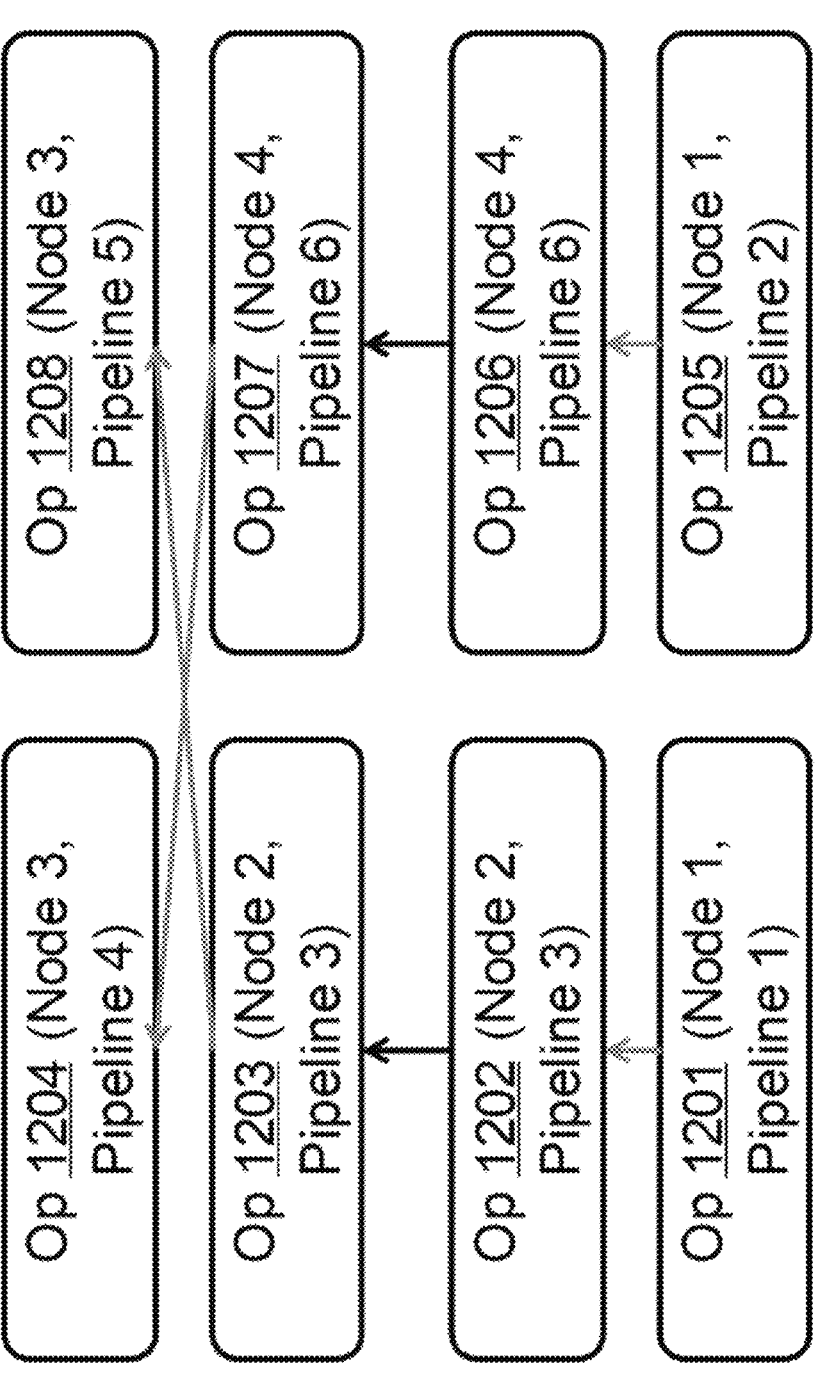
FIG. 12 illustrates a diagram of a plurality of operators in global pipelines, in accordance with some example implementations of the current subject matter.

Turning now to FIG. 12, a diagram of a plurality of operators in global pipelines are shown, in accordance with one or more embodiments of the current subject matter. In the example shown in FIG. 12, there are two global pipelines involving nodes 1,2,3 and nodes 1,4,3. On each node the operators with the smallest pipeline would be run. Operators 1201, 1202, 1203, 1204, 1206, and 1207 would run in parallel. However, operator 1203 cannot finish because operator 1208 is not yet running, since operator 1208 can only run when operator 1204 is finished.

In an example, a global representation check may include the following algorithm. For two receivers R1 and R2, where R1 may start execution before R2, the senders that are reachable from R1 are determined and the senders that are reachable from R2 are determined. If for a given node, a sender connected to R2 executes before a sender connected to R1, the check returns an error. Otherwise, the check returns an ok (i.e., a non-error indicator). It is noted that the term "receiver" may be defined as a receiving operator, and the term "sender" may be defined as a sending operator.

Continuing with the discussion of the above algorithm, R1 may start execution before R2 if the minimum pipeline of R1 is smaller than the minimum pipeline of R2. For each receiver, all of the senders connected to the receiver are determined, and the pipelines of these senders are identified. The term "minimum pipeline" may be defined as the pipeline having the smallest index of the pipelines of all of the senders connected to the corresponding receiver. In other words, the minimum pipeline is the pipeline which will start execution the earliest out of the pipelines of all of the senders connected to the corresponding receiver. Accordingly, the minimum pipeline of R1 is the pipeline having the smallest index of the pipelines of all of the senders connected to R1. Similarly, the term "maximum pipeline" may be defined as the pipeline having the largest index of the pipelines of all of the senders connected to the corresponding receiver. In other words, the maximum pipeline is the pipeline which will start execution the latest out of the pipelines of all of the senders connected to the corresponding receiver. Accordingly, the maximum pipeline of R1 is the pipeline having the largest index of the pipelines of all of the senders connected to R1.

Continuing with the discussion of the above algorithm, for each node, the largest of the minimum pipelines of the senders connected to R1 is compared with the smallest of the minimum pipelines of the senders connected to R2. It is noted that comparisons are not needed for all pairs of receivers. It may be enough to only compare each pair of adjacent receivers of a list of receivers when the list is sorted by each receiver's minimum pipeline. For each receiver, a "sender interval" is computed for each node. As used herein, the term "sender interval" may be defined as the range (i.e., distance, difference) between the minimum pipeline index and the maximum pipeline index of all reachable senders. To compute a receiver's "sender interval", the global pipeline graph is traversed in topological ordering. For each node, all sender intervals of previous nodes are pulled and merged. The previous nodes refers to all nodes that have been visited as of this point in time.

Then, for each node, an analysis is performed over a list of the node's receivers. For each pair (R1, R2) of receivers of the list, the sender interval is checked. An error is returned if based on the sender intervals, the minimum pipeline of R2 is bigger than the maximum pipeline of R1 and the maximum pipeline of the sender interval of R1 is bigger than the minimum pipeline of the sender interval of R2.

Figure 13:
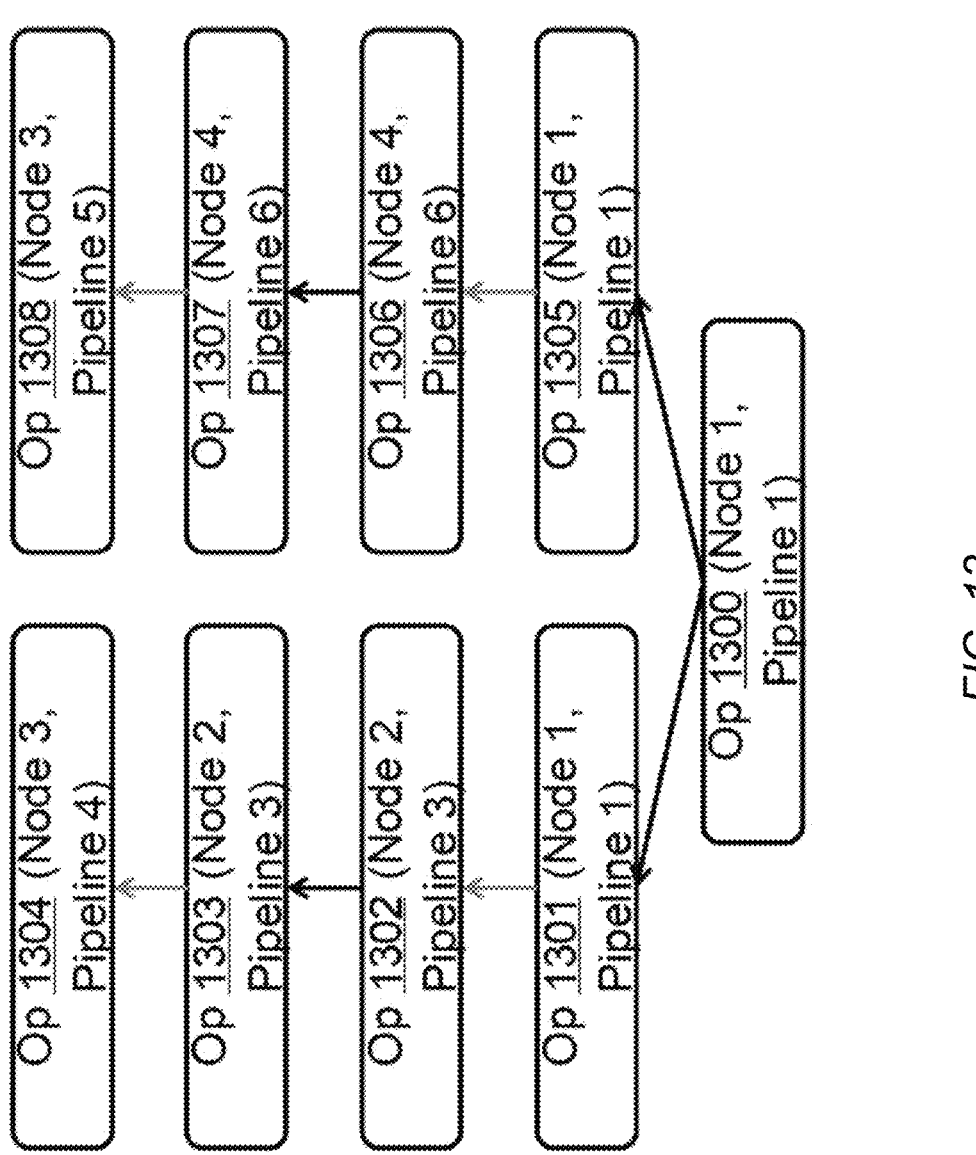
FIG. 13 illustrates a diagram of a global representation of a set of global pipelines, in accordance with some example implementations of the current subject matter.

Referring now to FIG. 13, a diagram of a global representation of a set of global pipelines is shown, in accordance with one or more embodiments of the current subject matter. As previously described, various checks may be performed on the global representation of a set of global pipelines to prevent potential deadlocks. In an example, if there are multiple sending operators in the same pipeline on a node N1 and two reachable receivers R1, R2 on another node N2, a check may be performed to ensure that the reachable receivers R1 and R2 are not in different pipelines. It is assumed for the purposes of this example that node N1 is different from node N2.

As shown in FIG. 13, operator 1304 may be reached from operator 1301 and operator 1308 may be reached from operator 1305. Operator 1301 and operator 1305 are in the same pipeline (pipeline 1) on the same node (node 1). But operators 1304 and 1308 are in different pipelines on another node (node 3). Operator 1305 cannot run and finish because operator 1308 has to start first. Operator 1308 only starts once operator 1304 has finished. Operator 1301 and operator 1305 may run repeatedly but in sequence. Thus, operator 1301 will not be run again and to completion if operator 1305 is not also able to be run.

At a high level, a deadlock check may be performed to detect conditions like the example shown in FIG. 13. This deadlock check may include the following algorithm: First, for each node that marks the start of a global pipeline, all receivers that are reachable are collected. Next, the receivers per node are collected. Then, if the intersection of the receiver pipelines on a node is empty, the receivers may run in different pipelines and the check returns an error. Otherwise, if the intersection of the receiver pipelines on a node is not empty, then the check returns an ok. An example of a check returning an ok is the following: R1{2,4} R2{4,6} R3{4,8} R4{4,10}. An example of a check returning an error is the following: R1{2,4} R2{4,6} R3{6,8} R4{6,10}. In this example of a check returning an error, R1 and R3 are in different pipelines. In other words, there is no intersection.

In another example, performing a deadlock check involves computing a dependency graph. In the dependency graph, an operator (either a receiver operator or a send operator) has an edge to another operator if the operator depends on the other operator. First, local dependencies are computed between operators of the same computation node. An operator depends on all operators that have a smaller finish sequence number. A finish sequence number indicates the ordering of finish calls of the operators on one computational node. Finish sequence numbers (e.g., F1, F2, F3, F4) are shown in FIG. 10 and FIG. 11. Each operator has a single, unique finish sequence number.

However, a receive operator does not depend on another operator (receiver or sender) if the receive operator started executing before the other operator finished. In other words, a dependency is not declared if the minimum pipeline of an operator is less than or equal to the maximum pipeline of the other operator. Otherwise, a dependency is added to the dependency graph (i.e., a directed edge is generated between the operators). After local dependencies have been generated, remote dependencies are added to the dependency graph. Remote dependencies are dependencies between operators of different computation nodes.

In general, a send operator depends on its corresponding receive operator, and a receive operator depends on its corresponding send operator. Thus, with an execution plan having at least one sender-receiver operator pair, there would be a direct cycle in the dependency graph. To avoid these direct cycles, the corresponding sender-receiver pair is not added as a remote dependency but instead the local dependencies of a sender-receiver pair are added to the dependency graph. For example, for a receive operator, all local dependencies of the receive operator's senders are added as remote dependencies. For a send operator, local dependencies of the send operator's receiver are added as remote dependencies.

In the last step, the final dependency graph is traversed and a check is performed to determine if the final dependency graph contains a cycle. If the final dependency graph contains a cycle, then the check returns an error. In an example, if the check returns an error, an error message may be generated in a graphical user interface (GUI) to inform a user of the error. Otherwise, if the final dependency graph does not contain a cycle, then the check returns an ok.

Figure 14:
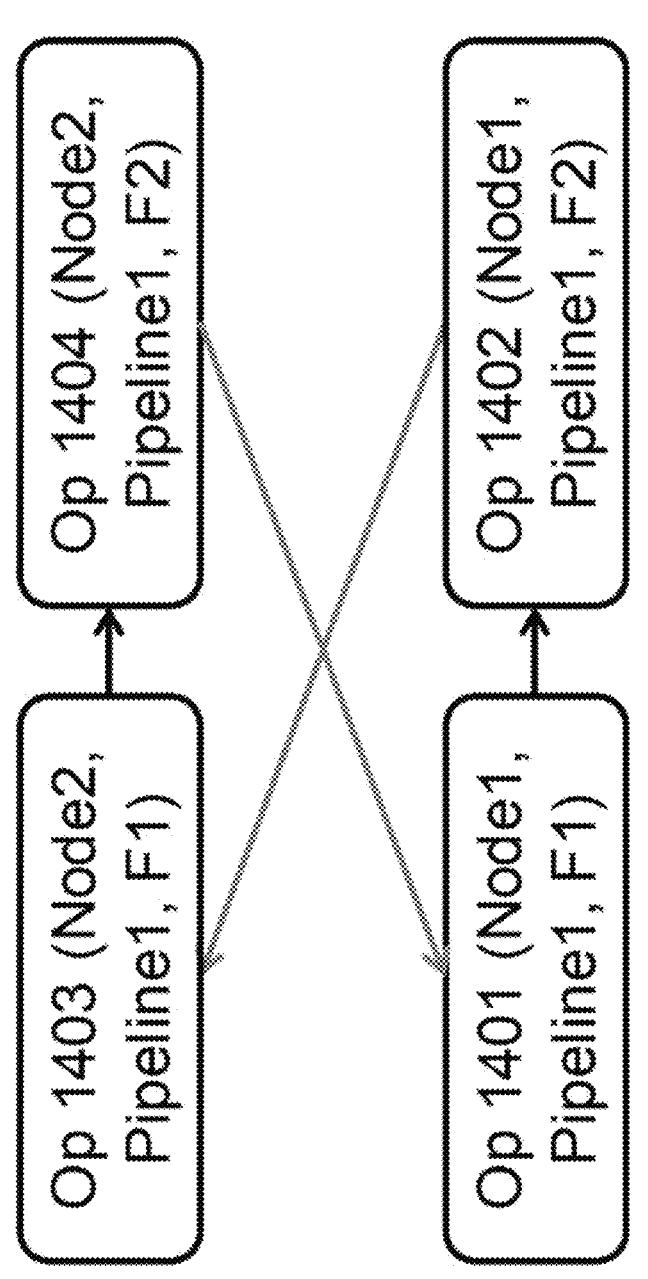
FIG. 14 illustrates an example of a cyclic dependency between senders and receivers, in accordance with some example implementations of the current subject matter.

Turning now to FIG. 14, an example of a cyclic dependency between senders and receivers is depicted, in accordance with one or more embodiments of the current subject matter. In the example shown in FIG. 14, operator 1401 waits on data from operator 1404. Operator 1404 has not started because operator 1403 has not finished. Operator 1403 waits on data from operator 1402. Operator 1402 has not started because operator 1401 has not finished. The checks that are being performed on representations of global pipelines are intended to detect cyclic dependencies like the one shown in FIG. 14. When a cyclic dependency is detected, execution of the corresponding execution plan is prevented from being initiated. Other actions may be taken in response to detecting a cyclic dependency, such as causing an alternate execution plan to be generated, executed a previous execution plan known to not have any cyclic dependencies, generating a graphical element to be displayed in a GUI to warn one or more users of the cyclic dependency, and/or other actions.

Figure 15:
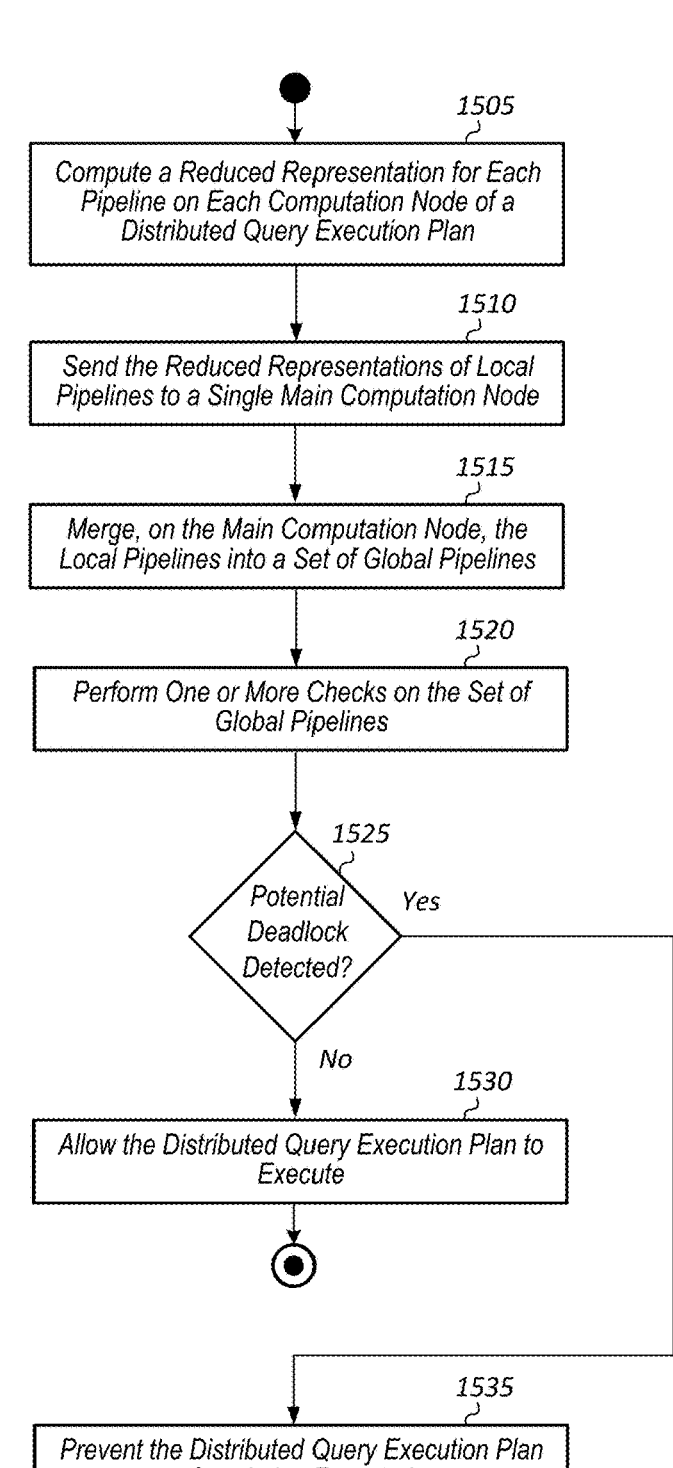
FIG. 15 illustrates an example of a process for detecting potential deadlocks in distributed query execution plans, in accordance with some example implementations of the current subject matter.

Referring now to FIG. 15, a process is depicted for detecting potential deadlocks in distributed query execution plans, in accordance with one or more embodiments of the current subject matter. A reduced representation is computed for each pipeline on each computation node of a distributed query execution plan (block 1505). In an example, a reduced representation of a pipeline consists only of sending operators, receiving operators, and optional place holders. Place holders may be used to reduce the number of connections in the graph. For an operator, the operator's origin node and the operator's finishing order may be stored.

Next, the reduced representations of local pipelines are sent to a single main computation node (block 1510). Then, on the main computation node, the local pipelines are merged into a set of global pipelines (block 1515). Next, one or more checks are performed on the set of global pipelines (block 1520). If the check(s) result in no potential deadlocks being detected (conditional block 1525, "no" leg), then the distributed query execution plan is allowed to execute (block 1530). Otherwise, if the check(s) result in a potential deadlock being detected (conditional block 1525, "yes" leg), then the distributed query execution plan is prevented from being executed (block 1535). In another example, if the check(s) result in a potential deadlock being detected, another distributed query execution plan (e.g., a previous version of the plan) may be executed instead of the current distributed query execution plan if the other distributed query executed plan is already known as being deadlock-free. After blocks 1530 and 1535, method 1500 may end.

Figure 16:
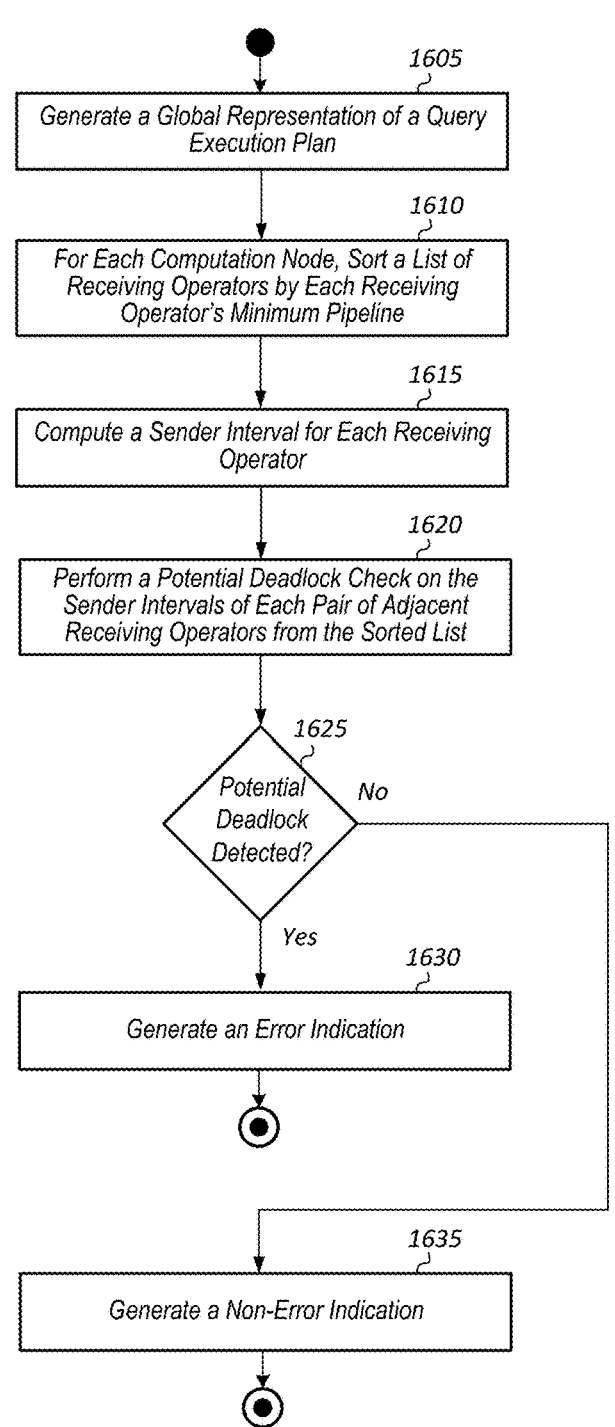
FIG. 16 illustrates an example of a process for performing a deadlock check on a global representation of a query execution plan, in accordance with some example implementations of the current subject matter.

Turning now to FIG. 16, a process is depicted for performing a deadlock check on a global representation of a query execution plan, in accordance with one or more embodiments of the current subject matter. A global representation of a query execution plan is generated (block 1605). In an example, steps 1505-1515 of method 1500 may be performed to generate a global representation of a query execution plan. In other embodiments, other steps may be performed to generate the global representation of the query execution plan.

Next, for each computation node, a list of receiving operators is sorted by each receiving operator's minimum pipeline (block 1610). Then, a sender interval is computed for each receiving operator (block 1615). In an example, the sender interval is computed as the range defined by a minimum pipeline of all reachable sending operators and a maximum pipeline of all reachable sending operators.

Next, for each computation node, a potential deadlock check is performed on the sender intervals of each pair of adjacent receiving operators from the sorted list (block 1620). In other words, the check is performed on each adjacent pair of receiving operators from the sorted list in block 1620. Each pair of receiving operators includes a first receiving operator and a second receiving operator, with the first receiving operator having a minimum pipeline which is less than or equal to the minimum pipeline of the second receiving operator.

If the minimum pipeline of the second receiving operator is bigger than the maximum pipeline of the first receiving operator and if the maximum pipeline of the sender interval of the first receiving operator is bigger than the minimum pipeline of the sender interval of the second receiving operator (conditional block 1625, "yes" leg), then an error indication is generated (block 1630). Other actions may also be taken in addition to generating an error indication, such as preventing execution of the query execution plan, determining a cause of the error, causing another query execution plan to be generated, and so on. Otherwise, if the minimum pipeline of the second receiving operator is less than or equal to the maximum pipeline of the first receiving operator or if the maximum pipeline of the sender interval of the first receiving operator is less than or equal to the minimum pipeline of the sender interval of the second receiving operator (conditional block 1625, "no" leg), then a non-error indication is generated (block 1635). Other actions may also be taken in addition to generating a non-error indication, such as allowing execution of the query execution plan and/or other actions. After blocks 1630 and 1635, method 1600 may end.

Figure 17A:
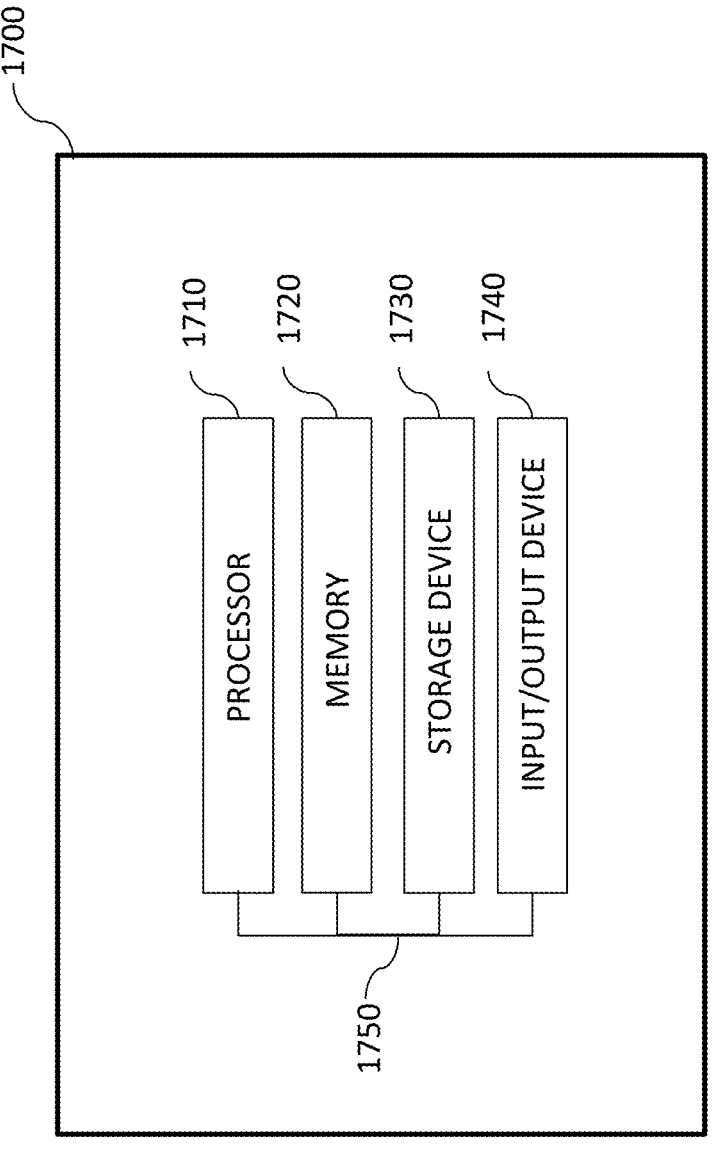
FIG. 17A depicts an example of a system, in accordance with some example implementations of the current subject matter.

In some implementations, the current subject matter may be configured to be implemented in a system 1700, as shown in FIG. 17A. The system 1700 may include a processor 1710, a memory 1720, a storage device 1730, and an input/output device 1740. Each of the components 1710, 1720, 1730 and 1740 may be interconnected using a system bus 1750. The processor 1710 may be configured to process instructions for execution within the system 1700. In some implementations, the processor 1710 may be a single-threaded processor. In alternate implementations, the processor 1710 may be a multi-threaded processor. The processor 1710 may be further configured to process instructions stored in the memory 1720 or on the storage device 1730, including receiving or sending information through the input/output device 1740. The memory 1720 may store information within the system 1700. In some implementations, the memory 1720 may be a computer-readable medium. In alternate implementations, the memory 1720 may be a volatile memory unit. In yet some implementations, the memory 1720 may be a non-volatile memory unit. The storage device 1730 may be capable of providing mass storage for the system 1700. In some implementations, the storage device 1730 may be a computer-readable medium. In alternate implementations, the storage device 1730 may be a floppy disk device, a hard disk device, an optical disk device, a tape device, non-volatile solid state memory, or any other type of storage device. The input/output device 1740 may be configured to provide input/output operations for the system 1700. In some implementations, the input/output device 1740 may include a keyboard and/or pointing device. In alternate implementations, the input/output device 1740 may include a display unit for displaying graphical user interfaces.

Figure 17B:
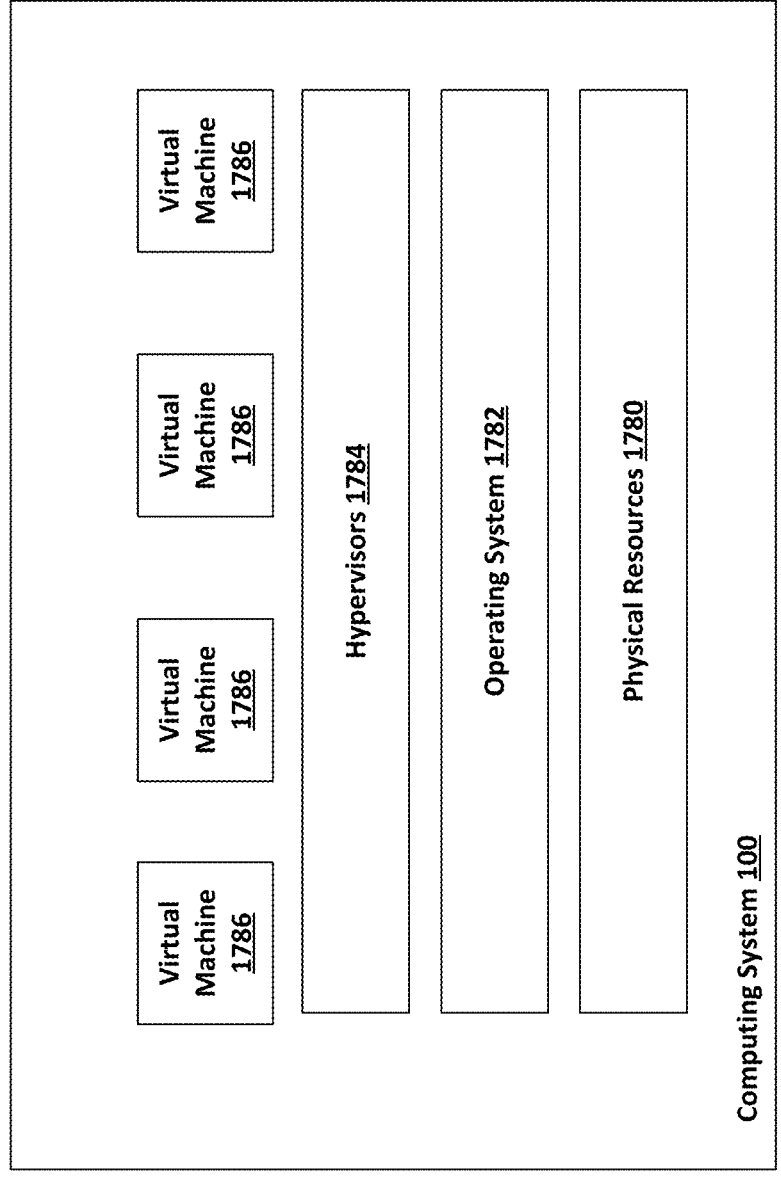
FIG. 17B depicts another example of a system, in accordance with some example implementations of the current subject matter.

FIG. 17B depicts an example implementation of the computing system 100 (of FIG. 1). The computing system 100 may be implemented using various physical resources 1780, such as at least one or more hardware servers, at least one storage, at least one memory, at least one network interface, and the like. The computing system 100 may also be implemented using infrastructure, as noted above, which may include at least one operating system 1782 for the physical resources 1780 and at least one hypervisor 1784 (which may create and run at least one virtual machine 1786). For example, each multitenant application may be run on a corresponding virtual machine 1786.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method comprising: receiving a first query execution plan to be executed on a plurality of computing nodes; determining whether the first query execution plan would result in an execution deadlock by: generating a reduced representation of a portion of the first query execution plan corresponding to each computing node of the plurality of computing nodes; merging the reduced representations of a plurality of portions of the first query execution plan into a set of global pipelines; and performing at least one deadlock check on the set of global pipelines; and preventing execution of the first query execution plan responsive to determining that the first query execution plan would result in an execution deadlock.

Example 2: The computer-implemented method of Example 1, further comprising computing on each computing node a reduced representation of one or more local pipelines, wherein the reduced representation comprises only sending operators, receiving operators, and place holders.

Example 3: The computer-implemented method of any of Examples 1-2, further comprising storing, for each operator, an origin node and a finishing order for the operator.

Example 4: The computer-implemented method of any of Examples 1-3, further comprising sorting, based on a minimum pipeline index of each receiving operator, a list of receiving operators, wherein the sorting is performed on each computing node.

Example 5: The computer-implemented method of any of Examples 1-4, further comprising computing a sender interval for each receiving operator.

Example 6: The computer-implemented method of any of Examples 1-5, wherein the sender interval is computed as a difference between a maximum pipeline index of all reachable sending operators and a minimum pipeline index of all reachable sending operators.

Example 7: The computer-implemented method of any of Examples 1-6, further comprising performing, on each computing node, the at least one deadlock check on each pair of adjacent receiving operators from the sorted list.

Example 8: The computer-implemented method of any of Examples 1-7, wherein each pair of adjacent receiving operators comprises a first receiving operator and a second receiving operator, wherein the at least one deadlock check comprises determining if a minimum pipeline index of the second receiving operator is bigger than a maximum pipeline index of the first receiving operator and if a maximum pipeline index of the sender interval of the first receiving operator is bigger than the minimum pipeline index of the sender interval of the second receiving operator.

Example 9: The computer-implemented method of any of Examples 1-8, wherein the at least one deadlock check comprises determining whether there is a given pair of receiving operators on a first node where a first receiving operator of the given pair is in an earlier pipeline that a second receiving operator, where the first receiving operator connects to a first sending operator on a second node, where the second receiving operator of the given pair connects to a second sending operator on the second node, and where the second sending operator is in an earlier pipeline than the first sending operator.

Example 10: The computer-implemented method of any of Examples 1-9, wherein the at least one deadlock check comprises determining whether there are multiple sending operators in a same pipeline on a first node and whether there are two reachable receiving operators on a second node that are in different pipelines.

Example 11: A system comprising: at least one processor; and at least one memory storing instructions that, when executed by the at least one processor, cause operations comprising: receiving a first query execution plan to be executed on a plurality of computing nodes; determining whether the first query execution plan would result in an execution deadlock by: generating a reduced representation of a portion of the first query execution plan corresponding to each computing node of the plurality of computing nodes; merging the reduced representations of a plurality of portions of the first query execution plan into a set of global pipelines; and performing at least one deadlock check on the set of global pipelines; and preventing execution of the first query execution plan responsive to the at least one deadlock check returning an error.

Example 12: The system of Example 11, wherein the operations further comprise computing on each computing node a reduced representation of one or more local pipelines, wherein the reduced representation comprises only sending operators, receiving operators, and place holders.

Example 13: The system of any of Examples 11-12, wherein the operations further comprise storing, for each operator, an origin node and a finishing order for the operator.

Example 14: The system of any of Examples 11-13, wherein the operations further comprise sorting, based on a minimum pipeline index of each receiving operator, a list of receiving operators, wherein the sorting is performed on each computing node.

Example 15: The system of any of Examples 11-14, wherein the operations further comprise computing a sender interval for each receiving operator.

Example 16: The system of any of Examples 11-15, wherein the sender interval is computed as a difference between a maximum pipeline index of all reachable sending operators and a minimum pipeline index of all reachable sending operators.

Example 17: The system of any of Examples 11-16, wherein the operations further comprise performing, on each computing node, the at least one deadlock check on each pair of adjacent receiving operators from the sorted list.

Example 18: The system of any of Examples 11-17, wherein each pair of adjacent receiving operators comprises a first receiving operator and a second receiving operator, wherein the at least one deadlock check comprises determining if a minimum pipeline index of the second receiving operator is bigger than a maximum pipeline index of the first receiving operator and if a maximum pipeline index of the sender interval of the first receiving operator is bigger than the minimum pipeline index of the sender interval of the second receiving operator.

Example 19: The system of any of Examples 11-18, wherein the at least one deadlock check comprises determining whether there is a given pair of receiving operators on a first node where a first receiving operator of the given pair is in an earlier pipeline that a second receiving operator, where the first receiving operator connects to a first sending operator on a second node, where the second receiving operator of the given pair connects to a second sending operator on the second node, and where the second sending operator is in an earlier pipeline than the first sending operator.

Example 20: A non-transitory computer readable medium storing instructions, which when executed by at least one data processor, result in operations comprising: receiving a first query execution plan to be executed on a plurality of computing nodes; determining whether the first query execution plan would result in an execution deadlock by: generating a reduced representation of a portion of the first query execution plan corresponding to each computing node of the plurality of computing nodes; merging the reduced representations of a plurality of portions of the first query execution plan into a set of global pipelines; and performing at least one deadlock check on the set of global pipelines; and preventing execution of the first query execution plan responsive to the at least one deadlock check returning an error.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
receiving a first query execution plan to be executed on a plurality of computing nodes, each computing node comprising one or more local pipelines that include a sequence of operators for executing the first query execution plan;
determining whether the first query execution plan would result in an execution deadlock by:
generating a reduced representation of a portion of the first query execution plan corresponding to the one or more local pipelines of each computing node of the plurality of computing nodes;
merging the reduced representations of a plurality of portions of the first query execution plan into a set of global pipelines, wherein the set of global pipelines comprises multiple local pipelines of different nodes of the plurality of computing nodes, with the multiple local pipelines being connected together; and
performing at least one deadlock check on the set of global pipelines; and
preventing execution of the first query execution plan responsive to determining that the first query execution plan would result in an execution deadlock based on the at least one deadlock check.

2. The computer-implemented method of claim 1, further comprising computing on each computing node a reduced representation of the one or more local pipelines, wherein the reduced representation comprises only sending operators, receiving operators, and place holders.

3. The computer-implemented method of claim 1, further comprising storing, for each operator, an origin node and a finishing order for the operator.

4. The computer-implemented method of claim 1, further comprising sorting, based on a minimum pipeline index of each receiving operator, a list of receiving operators, wherein the sorting is performed on each computing node.

5. The computer-implemented method of claim 4, further comprising computing a sender interval for each receiving operator.

6. The computer-implemented method of claim 5, wherein the sender interval is computed as a difference between a maximum pipeline index of all reachable sending operators and a minimum pipeline index of all reachable sending operators.

7. The computer-implemented method of claim 6, further comprising performing, on each computing node, the at least one deadlock check on each pair of adjacent receiving operators from the sorted list.

8. The computer-implemented method of claim 7, wherein each pair of adjacent receiving operators comprises a first receiving operator and a second receiving operator, wherein the at least one deadlock check comprises determining if a minimum pipeline index of the second receiving operator is bigger than a maximum pipeline index of the first receiving operator and if a maximum pipeline index of the sender interval of the first receiving operator is bigger than the minimum pipeline index of the sender interval of the second receiving operator.

9. The computer-implemented method of claim 1, wherein the at least one deadlock check comprises determining whether there is a given pair of receiving operators on a first node where a first receiving operator of the given pair is in an earlier pipeline that a second receiving operator, where the first receiving operator connects to a first sending operator on a second node, where the second receiving operator of the given pair connects to a second sending operator on the second node, and where the second sending operator is in an earlier pipeline than the first sending operator.

10. The computer-implemented method of claim 1, wherein the at least one deadlock check comprises determining whether there are multiple sending operators in a same pipeline on a first node and whether there are two reachable receiving operators on a second node that are in different pipelines.

11. A system comprising:
at least one hardware processor; and
at least one memory storing instructions that, when executed by the at least one hardware processor, cause operations comprising:
receiving a first query execution plan to be executed on a plurality of computing nodes, each computing node comprising one or more local pipelines that include a sequence of operators for executing the first query execution plan;
determining whether the first query execution plan would result in an execution deadlock by:
generating a reduced representation of a portion of the first query execution plan corresponding to the one or more local pipelines of each computing node of the plurality of computing nodes;
merging the reduced representations of a plurality of portions of the first query execution plan into a set of global pipelines, wherein the set of global pipelines comprises multiple local pipelines of different nodes of the plurality of computing nodes, with the multiple local pipelines being connected together; and
performing at least one deadlock check on the set of global pipelines; and
preventing execution of the first query execution plan responsive to determining that the first query execution plan would result in an execution deadlock based on the at least one deadlock check.

12. The system of claim 11, wherein the operations further comprise computing on each computing node a reduced representation of the one or more local pipelines, wherein the reduced representation comprises only sending operators, receiving operators, and place holders.

13. The system of claim 11, wherein the operations further comprise storing, for each operator, an origin node and a finishing order for the operator.

14. The system of claim 11, wherein the operations further comprise sorting, based on a minimum pipeline index of each receiving operator, a list of receiving operators, wherein the sorting is performed on each computing node.

15. The system of claim 14, wherein the operations further comprise computing a sender interval for each receiving operator.

16. The system of claim 15, wherein the sender interval is computed as a difference between a maximum pipeline index of all reachable sending operators and a minimum pipeline index of all reachable sending operators.

17. The system of claim 16, wherein the operations further comprise performing, on each computing node, the at least one deadlock check on each pair of adjacent receiving operators from the sorted list.

18. The system of claim 17, wherein each pair of adjacent receiving operators comprises a first receiving operator and a second receiving operator, wherein the at least one deadlock check comprises determining if a minimum pipeline index of the second receiving operator is bigger than a maximum pipeline index of the first receiving operator and if a maximum pipeline index of the sender interval of the first receiving operator is bigger than the minimum pipeline index of the sender interval of the second receiving operator.

19. The system of claim 11, wherein the at least one deadlock check comprises determining whether there is a given pair of receiving operators on a first node where a first receiving operator of the given pair is in an earlier pipeline that a second receiving operator, where the first receiving operator connects to a first sending operator on a second node, where the second receiving operator of the given pair connects to a second sending operator on the second node, and where the second sending operator is in an earlier pipeline than the first sending operator.

20. A non-transitory computer readable medium storing instructions, which when executed by at least one data processor, result in operations comprising:
receiving a first query execution plan to be executed on a plurality of computing nodes, each computing node comprising one or more local pipelines that include a sequence of operators for executing the first query execution plan;
determining whether the first query execution plan would result in an execution deadlock by:
generating a reduced representation of a portion of the first query execution plan corresponding to the one or more local pipelines of each computing node of the plurality of computing nodes;
merging the reduced representations of a plurality of portions of the first query execution plan into a set of global pipelines, wherein the set of global pipelines comprises multiple local pipelines of different nodes of the plurality of computing nodes, with the multiple local pipelines being connected together; and
performing at least one deadlock check on the set of global pipelines; and
preventing execution of the first query execution plan responsive to determining that the first query execution plan would result in an execution deadlock based on the at least one deadlock check returning an error.

* * * * *